G. C. JENSEN.
APPARATUS FOR LOCKING LEVERS.
APPLICATION FILED MAR. 31, 1917.
1,240,346.
Patented Sept. 18, 1917.
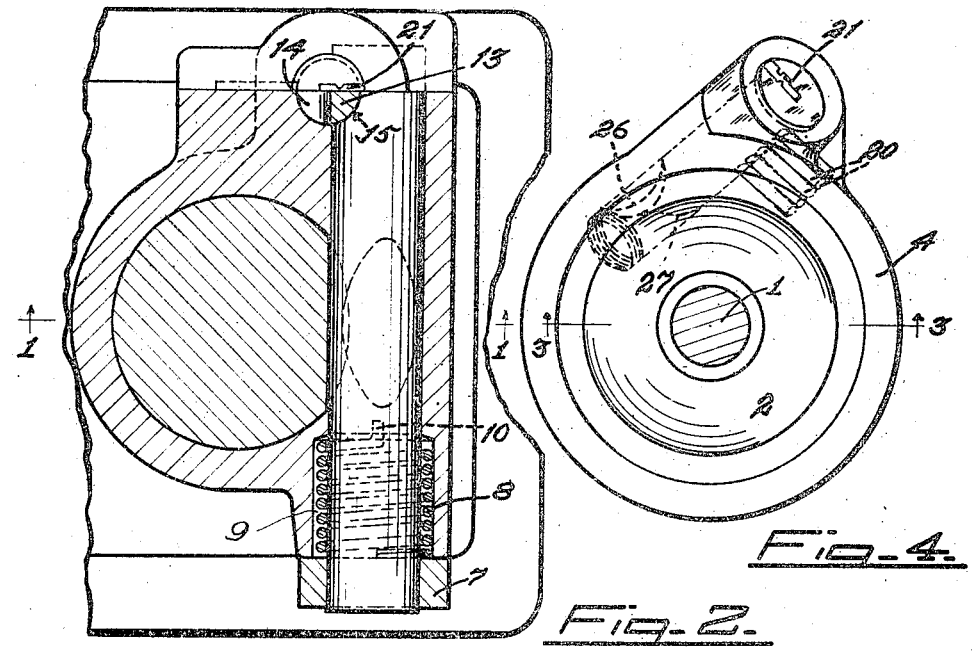
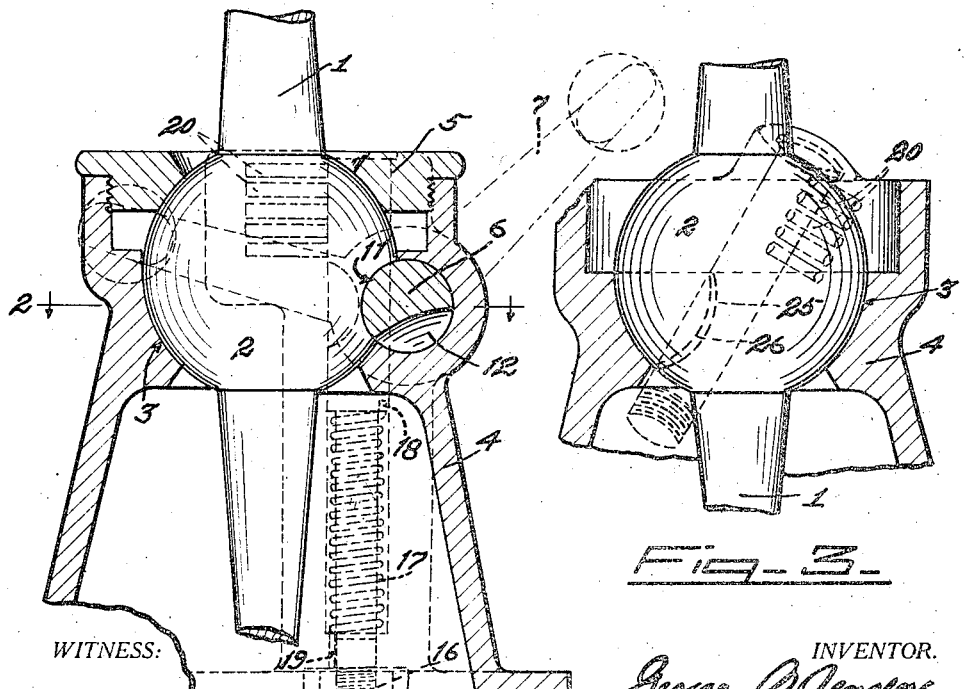
WITNESS:
INVENTOR.
BY
his ATTORNEYS.

UNITED STATES PATENT OFFICE.

GEORGE C. JENSEN, OF OAKLAND, CALIFORNIA.

APPARATUS FOR LOCKING LEVERS.

1,240,346.  Specification of Letters Patent.  Patented Sept. 18, 1917.

Application filed March 31, 1917.  Serial No. 158,871.

*To all whom it may concern:*

Be it known that I, GEORGE C. JENSEN, a citizen of the United States, residing at Oakland, in the county of Alameda and State of California, have invented certain new and useful Improvements in Apparatus for Locking Levers, of which the following is a specification.

The present invention relates to mechanism for locking levers and more particularly to the type of locking mechanism which is simple in construction and is composed of but few parts and is designed for use in connection with the shift levers of variable speed power transmitting mechanism.

The invention consists broadly in providing a bore formed partly in the lever and partly in its support and adapted to coöperate to secure a locking bolt held in locked position to lock the lever from movement when desired.

To more fully comprehend the invention reference is directed to the accompanying drawings, wherein:—

Figure 1 is a vertical sectional view of the preferred embodiment of my invention, taken on line 1—1 of Fig. 2;

Fig. 2 is a plan view partly in section on line 2—2 of Fig. 1 illustrating the locking bolt in operative position.

Fig. 3 is a sectional view taken on line 3—3 of Fig. 4.

Fig. 4 is a view in plan of a modified form of construction.

Referring more particularly to the several views of the drawings, 1 indicates a suitable lever, preferably of the type adapted for shifting speed mechanism of a motor vehicle, and the same is provided intermediate of its length with a spherical fulcrum portion 2 adapted to seat within the spherical socket 3 provided in the tubular support 4. The lever is held in position in the socket by a suitable retaining ring 5 threaded to the upper portion of the tubular support 4 of the spherical portion 2.

A suitable locking bolt 6 rotatable on a horizontal axis, extends transversely through a bore in the support 4 and intersects the tubular portion thereof. The bolt 6 carries an operating lever 7 which enables the same to be readily rotated. To the bolt is attached one end of a spring 8, coiled about the bolt within a recess 9 surrounding the same, and with its opposite end attached as at 10 to a stationary portion of the support 4. The action of the spring 8 is to automatically rotate the locking bolt to its hereinafter termed "inoperative" position on the release of the hereinafter described locking means therefor.

The spherical portion 2 of the lever and the locking bolt 6 are each provided with the respective coöperating recesses 11 and 12 adapted to register with each other when the bolt is rotated to inoperative position, to permit the free pivotal movement of the lever within its socket.

The rotation of the bolt to inoperative position by the spring 8, as in Figs. 1 and 2 of the drawings removes the recess 12 thereof from register with the recess 11 of the lever thereby seating a solid portion of the bolt within the recess 12 of the lever thus locking the lever from operative movement or from removal from its socket.

To lock the bolt in its operative position, a rotatable vertically disposed locking barrel 13 is employed, the same being received within a suitable tubular socket within the tubular portion 4 and intersecting the bore within which the locking bolt 6 is received. The locking barrel is provided in its periphery with a recess 14 in line with the locking bolt 6 and said bolt is also provided with a recess 15 adapted on the rotation of the barrel to unlocked position to register with the recess 14 to permit of the rotation of the bolt to inoperative position.

The lower end of the barrel operates in a bearing 16, and is surrounded by a spring 17 secured at one end to the barrel, as at 18, and its other end is fastened, as at 19, to the support 4. The action of the spring being to rotate the barrel to a position as in Fig. 2 on the rotation of the locking bolt to cause the depressions 11 and 12 to register, in which position the barrel is retained by the usual key controlled tumblers 20, releasable on the insertion of a key, not shown, into the opening 21 in the upper end of the barrel when it is desired to rotate the barrel to operative position against the tension of the spring 17 and permit the bolt to be automatically returned to inoperative position by the action of the spring 8.

In the registering of the recesses 11 and 12 the barrel is automatically rotated by the spring 17 to a position as in Fig. 2, where it locks the bolt from movement and on the insertion of the controlling key in the opening 21 and the rotating of the barrel, the recesses 14 and 15 are caused to register, at which time the spring 8 will automatically rotate the bolt 6 to permit the operation of the lever.

In the modified form illustrated in Figs. 3 and 4, the barrel is incorporated with the locking bolt the two providing a rotatable locking member 25 which extends downwardly through an angularly disposed bore within the support 4 and which intersects the spherical socket portion of the lever. As in the preferred construction the locking member and spherical portion 2 are provided with the respective recesses 26 and 27 adapted when the locking member is rotated to unlocked position through the insertion of a controlling key not shown, into the key slot 21 to register and to permit of the pivotal movement of the lever. On the rotation of the locking member to operative position the recess 26 is rotated from registering with the recess 27 and a solid portion of the locking member is received within said recess 27 which prevents the operation of said lever or its removal from its socket.

It is apparent in both the preferred and modified construction I provide a bore within the socket member and disposed tangentially of the spherical portion of the lever, the bore intersecting said spherical portion and in the same there is positioned a locking member capable of movement, preferably a rotative movement to position a portion thereof within that portion of the bore lying within the lever thus locking the lever from pivotal movement or from removal from its socket, the locking member being also capable of movement to permit the pivoting of the lever within its socket.

Having thus described my invention what I claim is:—

1. In combination with a lever provided with a substantially spherical portion pivotally mounted for universal swinging movement within a substantially spherical socket member and capable of removal therefrom, said socket member provided with a bore disposed tangentially to the spherical portion and intersecting the same, and a rotatable locking member within said bore and capable of operative movement therein to lock said lever from pivotal movement within or removal from its socket.

2. In combination with a lever provided with a substantially spherical portion pivotally mounted for universal swinging movement within a substantially spherical socket member, said socket member provided with a bore disposed tangentially to the spherical portion and intersecting the same, and a locking member rotatably mounted within said bore and capable of rotation therein to operative position to lock said lever from operative movement within its socket.

3. In combination with a lever provided with a substantially spherical portion pivotally mounted for universal swinging movement within a substantially spherical socket member, said socket member being provided with a bore disposed tangentially to the spherical portion and intersecting the same, and a rotatable locking member within said bore and provided with a depression for registering with the portion of said bore within said spherical portion when the locking member is rotated to inoperative position to permit of the free movement of the lever within its socket.

4. In combination with a lever provided with a substantially spherical portion pivotally mounted for universal swinging movement within a substantially spherical socket member and capable of removal therefrom, said socket member provided with a bore disposed tangentially to the spherical portion and intersecting the same, a locking member rotatable within said bore and capable when in operative position of locking said lever from pivotal movement within its socket or removal therefrom, and lock controlled means for retaining said locking member in its operative position.

5. In combination with a lever provided with a substantially spherical portion pivotally mounted for universal swinging movement within a substantially spherical socket member, said socket member provided with a bore disposed tangentially through the spherical portion and intersecting the same, a locking member rotatably mounted within said bore and capable of movement into operative position to lie within the portion of said bore within said spherical portion to lock said lever from movement, means for automatically locking said member in its operative position when moved thereinto, and means for automatically returning said locking member to inoperative position on the release of said locking means.

6. In combination with a lever provided with a substantially spherical portion pivotally mounted for universal swinging movement within a substantially spherical socket member, said socket member provided with a bore disposed tangentially to the spherical portion and intersecting the same, a locking member rotatably mounted within said bore and capable of movement to operative position to lie within the portion of said bore within said spherical portion to lock said lever from movement, a locking barrel rotatably mounted in said socket member and disposed at an angle thereto, said barrel and locking members formed in their peripheries with depressions adapted to coöperate to permit of the movement of said member to inoperative position, said barrel capable of rotation to position a solid portion thereof within the depression within said member when the same is in operative position to lock said member from movement.

In testimony whereof I have signed my name to this specification in the presence of a subscribing witness.

GEORGE C. JENSEN.

Witness:
D. B. RICHARDS.